(12) United States Patent
Lee et al.

(10) Patent No.: US 8,129,985 B2
(45) Date of Patent: Mar. 6, 2012

(54) POSITION ENCODER

(75) Inventors: Robin Lee, Cambridge (GB); Graham Lodge, Cambs (GB); Ross Jones, Cambridge (GB)

(73) Assignee: Sagentia Limited, Harston Cambridge (GB)

( * ) Notice: Subject to any disclaimer, the term of this patent is extended or adjusted under 35 U.S.C. 154(b) by 1017 days.

(21) Appl. No.: 11/915,277

(22) PCT Filed: Mar. 23, 2007

(86) PCT No.: PCT/GB2007/001057
§ 371 (c)(1), (2), (4) Date: Mar. 24, 2008

(87) PCT Pub. No.: WO2007/110603
PCT Pub. Date: Oct. 4, 2007

(65) Prior Publication Data
US 2008/0197836 A1      Aug. 21, 2008

(30) Foreign Application Priority Data

Mar. 25, 2006  (GB) .................................. 0606055.2
Dec. 20, 2006  (GB) .................................. 0625428.8

(51) Int. Cl.
*G01B 7/30* (2006.01)
(52) U.S. Cl. ......... 324/207.25; 324/207.16; 324/207.17; 324/207.23; 324/207.21; 324/207.13; 324/207.12; 235/449; 235/95 R; 235/95 C; 235/96; 701/35
(58) Field of Classification Search ............. 324/207.25, 324/207.16, 207.17, 207.23, 207.21, 207.13, 324/207.12; 235/449, 95 R, 95 C, 96; 701/35
See application file for complete search history.

(56) References Cited

U.S. PATENT DOCUMENTS

| | | | |
|---|---|---|---|
| 2,931,023 A | | 3/1960 | Quade |
| 3,723,880 A | * | 3/1973 | Van Gerwen ................. 375/286 |
| 3,963,098 A | * | 6/1976 | Lewis et al. .................... 187/394 |
| 4,687,928 A | * | 8/1987 | Thurston ................... 250/231.17 |
| 4,737,698 A | | 4/1988 | McMullin et al. |

(Continued)

FOREIGN PATENT DOCUMENTS
AU           726074         2/1998
(Continued)

OTHER PUBLICATIONS

International Search Report for International Application No. PCT/GB2007/001057 completed Jun. 25, 2007.

*Primary Examiner* — Huy Q Phan
*Assistant Examiner* — Lamarr Brown
(74) *Attorney, Agent, or Firm* — Alston & Bird LLP

(57) ABSTRACT

An inductive position encoder is described having first and second members which are relatively moveable over a measurement path, a magnetic device mounted on the first member; a plurality of first windings mounted on the second member; and a second winding. The magnetic device is operable to interact with the windings such that upon the energization of either the second winding or the first windings, there is generated a plurality of sensor signals each being associated with a respective one of said first windings and varying with the relative position between said magnetic device and the associated first winding and hence with the relative position between said first and second members. Additionally, the plurality of first windings are arranged along said measurement path so that the sensor signals vary substantially in accordance with a predetermined Gray code.

36 Claims, 7 Drawing Sheets

U.S. PATENT DOCUMENTS

| | | | | |
|---|---|---|---|---|
| 4,975,564 | A | * | 12/1990 | Maschino ................... 235/96 |
| 5,150,115 | A | * | 9/1992 | deJong et al. ............ 340/870.31 |
| 5,210,380 | A | * | 5/1993 | McDermott et al. ....... 178/18.07 |
| 5,565,861 | A | | 10/1996 | Mettler et al. |
| 5,621,316 | A | * | 4/1997 | Dames et al. ............ 324/207.13 |
| 5,796,250 | A | | 8/1998 | Dames |
| 6,333,626 | B1 | * | 12/2001 | Edwards ....................... 324/110 |
| 6,522,128 | B1 | * | 2/2003 | Ely et al. .................. 324/207.17 |
| 6,625,517 | B1 | * | 9/2003 | Bogdanov et al. ............ 700/193 |
| 6,626,048 | B1 | * | 9/2003 | Dam Es et al. ............. 73/861.13 |
| 6,788,221 | B1 | * | 9/2004 | Ely et al. ......................... 341/20 |
| 6,836,128 | B2 | * | 12/2004 | Palata .......................... 324/655 |
| 2001/0003422 | A1 | * | 6/2001 | Andermo et al. ......... 324/207.17 |
| 2001/0020846 | A1 | * | 9/2001 | Miyata ..................... 324/207.17 |
| 2003/0020642 | A1 | * | 1/2003 | Ely et al. ........................ 341/111 |
| 2003/0034785 | A1 | * | 2/2003 | Palata ........................... 324/601 |
| 2005/0110359 | A1 | * | 5/2005 | Felsenstein et al. .......... 310/184 |
| 2005/0270040 | A1 | * | 12/2005 | Stridsberg ..................... 324/662 |
| 2006/0071832 | A1 | * | 4/2006 | Regev ........................... 341/143 |
| 2007/0194781 | A1 | * | 8/2007 | Zhitomirskiy ............ 324/207.17 |
| 2010/0268625 | A1 | * | 10/2010 | Lee et al. ........................ 705/29 |

FOREIGN PATENT DOCUMENTS

| | | |
|---|---|---|
| AU | 726074 | 10/2000 |
| DE | 10121870 | 11/2002 |
| EP | 0519333 | 12/1992 |
| EP | 0759539 | 8/1995 |
| FR | 2743882 | 7/1997 |
| GB | 1416895 | 12/1975 |
| GB | 2049939 | 12/1980 |
| GB | 2297005 | 7/1996 |
| GB | 2394293 | 4/2004 |
| GB | 2427030 | 12/2006 |
| JP | 2006098141 | 4/2006 |
| WO | WO94/25829 | 11/1994 |
| WO | WO 95/31696 | 11/1995 |
| WO | WO2006/043078 | 10/2004 |

* cited by examiner

POSITION ENCODER

The present invention relates to a method and apparatus for indicating the position of a moveable member such as a dial, wheel or shaft. The invention has particular, although not exclusive relevance to the determination of the position of the dials of a mechanical odometer. The invention also relates to position sensing transducers for use in such encoders.

There are many products which use mechanical odometers. Such odometers usually comprise a number of wheels or dials, stacked side by side, that are mechanically geared together to record the number of rotations of a shaft to which they are connected. A typical example is the trip odometer in a car for recording the distance traveled. Another example is found in utility meters for water and gas. In some applications, it is required to read the position of the dials electronically. In the case of utility meters, it is important to have a system which does not have friction or torque to the odometer which will cause the meter to under-read. In practice, this usually means that the electronic reading has to be done with a non-contact technique. In particular, contact methods such as using gold contacting wiper switches brushing on a patterned contact plate on the side of each dial are restricted to very low numbers of dials (four or less) before they affect the meter reading through friction.

Non-contact methods have been developed to read such odometers. A five wheel non-contact electronic encoder is marketed by GWF Gas-und Wassermesserfabrik AG which uses a series of opto-switches on each dial. This non-contact electronic encoder is described in U.S. Pat. No. 5,565,861. Plastic light pipes guide LED light, from a PCB, between each dial. The light passes through slots in the dial which are open or closed depending on the dial position and this is detected on the PCB. The system described in US '861 is, however, expensive as it requires the use of multiple photodiodes, light pipes, and light emitting diodes to perform the signal processing.

Another non-contact method has been developed by Sensus Metering Systems, Inc which is described in U.S. Pat. No. 5,796,250. This Sensus system is a non-contact inductive system in which each dial has an embedded resonant target that can be interrogated by coils surrounding the odometer. However, the system described in US '250 is complicated and difficult to manufacture due to the requirement of winding several different coils around the odometer which are used to excite, at the same time, the resonant targets and to receive the signals from the resonant targets also at the same time. The system used by Sensus Metering Systems Inc also requires complicated excitation and processing circuitry that is implemented in an ASIC in order to be able to energise the different resonators in the different dials and to be able to differentiate the signals from the different resonators from the receive windings.

There is therefore a need to provide a low cost non-contact method and apparatus that allows for the electronic reading of an odometer.

In the following description and appended claims, reference will be made to a number of windings. This term should be construed broadly to cover an actual winding or coil as well as conductive tracks formed on printed circuit boards or conductive material printed or mounted on an insulating substrate.

According to one aspect, the present invention provides an inductive position encoder comprising: first and second members which are relatively moveable over a measurement path; a magnetic device mounted on the first member; a plurality of first windings mounted on the second member; and a second winding; wherein said magnetic device is operable to interact with said windings such that upon the energisation of one of said second winding and said first windings, there is generated a plurality of sensor signals in the other one of said second winding and said first windings, each sensor signal being associated with a respective one of said first windings and varying with the relative position between said magnetic device and the associated first winding and hence with the relative position between said first and second members; wherein said plurality of first windings are arranged to define a plurality of zones sequentially arranged along the measurement path in accordance with a predetermined code so that said plurality of sensor signals vary with the relative position of said first and second members in accordance with said predetermined code; and wherein said plurality of first windings are arranged along said measurement path so that over at least the majority of said zones, said sensor signals vary in accordance with a predetermined Gray code.

In one embodiment each of said first windings comprises a plurality of series connected conductor loops, the winding direction of the loops being varied over the measurement path to define different states of said Gray code. The code may be a binary code or a multilevel code. Excitation and processing circuitry may also be provided for processing said sensor signals to determine a code word corresponding to one of said zones and to determine the relative position between said first and second members from the determined code word and stored data relating code words to the positions of said zones.

In one embodiment said second winding is also mounted on said second member. However, instead it may be mounted on another member located in the vicinity of the first windings and said magnetic device.

The first windings may be used as excitation windings and the second winding as a receive winding or vice versa. In a preferred embodiment the first windings are electromagnetically balanced with respect to the second winding, in the absence of said magnetic device.

The windings are preferably formed from conductor tracks formed on a number of layers of a printed circuit board as these are easy and cheap to manufacture. However, other techniques can be used to make the windings, such as screen printing of the windings using conductive ink. In either case, the first windings are preferably superimposed over each other, with conductor tracks forming the first windings being provided on a plurality of different layers of an insulator substrate to avoid electrical connection between the different windings.

The magnetic device preferably comprises an un-patterned conductor element, although a patterned conductive element may also be used. Other magnetic devices that can be used include: a short circuit coil, a conductive element, a resonator, a conductor having a hole, an inhomogeneity in a magnetic film etc.

In one embodiment, the measurement path follows a closed path (such as a circular path) and said Gray code is cyclic. The first windings are also preferably arranged to define $2^n$ zones or less, where n is the number of said first windings.

In one specific embodiment, each first winding comprises a plurality of loops sequentially arranged along the measurement path and arranged so that at least one characteristic of the magnetic coupling between that first winding and said second winding (such as the amplitude and/or polarity) changes at the boundary between adjacent loops; wherein the boundaries between said zones are defined by the locations of the boundaries between the adjacent loops of the different first windings; wherein each of said first windings is arranged along the measurement path so that relative movement between said magnetic device and the loops of that first winding causes the associated sensor signal to vary in accordance with a respective different symbol of said predetermined code; and wherein said plurality of first windings are arranged along said measurement path so that at least the majority of the boundaries between adjacent loops of said first windings are each located at the boundary between a respective different two zones.

In one application, a device is provided that has a plurality of dials, at least some of which have the above position encoder for encoding the position of the associated dial. In this case, the windings of said position encoders are preferably connected to a common processing circuit.

According to another aspect, the invention provides an apparatus for indicating the angular position of a rotatable member, the apparatus comprising: a plurality of windings mounted adjacent the rotatable member; and a magnetic device electromagnetically coupled, in use, to said windings; wherein each of said windings is arranged for energising said magnetic device or for receiving a signal from the magnetic device when energised and arranged so that when said magnetic device is energised sensor signals are generated that vary with the angular position of said rotatable member substantially in accordance with a Gray code.

Another aspect of the invention provides an odometer comprising: a plurality of rotatable dials sequentially positioned adjacent each other and arranged so that as each dial rotates through one revolution, a subsequent dial in the sequence rotates through a part of a revolution; a corresponding plurality of non-contact position sensing transducers, each non-contact position sensing transducer being located adjacent the corresponding dial between that dial and an adjacent dial in the sequence, and each comprising one or more excitation windings and one or more receive windings; wherein each dial carries a magnetic device positioned adjacent the corresponding position sensing transducer and operable to interact with said windings such that upon the energisation of said one or more excitation windings there is generated in the one or more receive windings sensor signals that vary with the angular position of the corresponding dial; and wherein the windings mounted on each position sensing transducer have a position sensing range and wherein said dials and said position sensing transducers are arranged so that the magnetic device carried by each dial is within the position sensing range of the windings of the corresponding position sensing transducer, but outside the position sensing range of the windings of the other position sensing transducers.

According to this aspect, each dial preferably has a diameter of between 15 mm and 25 mm and is separated from adjacent dials by a distance of between 4 mm and 7 mm.

These and other aspects of the invention will become apparent from the description of the following exemplary embodiments which is given with reference to the accompanying figures, in which.

Figure 6A:
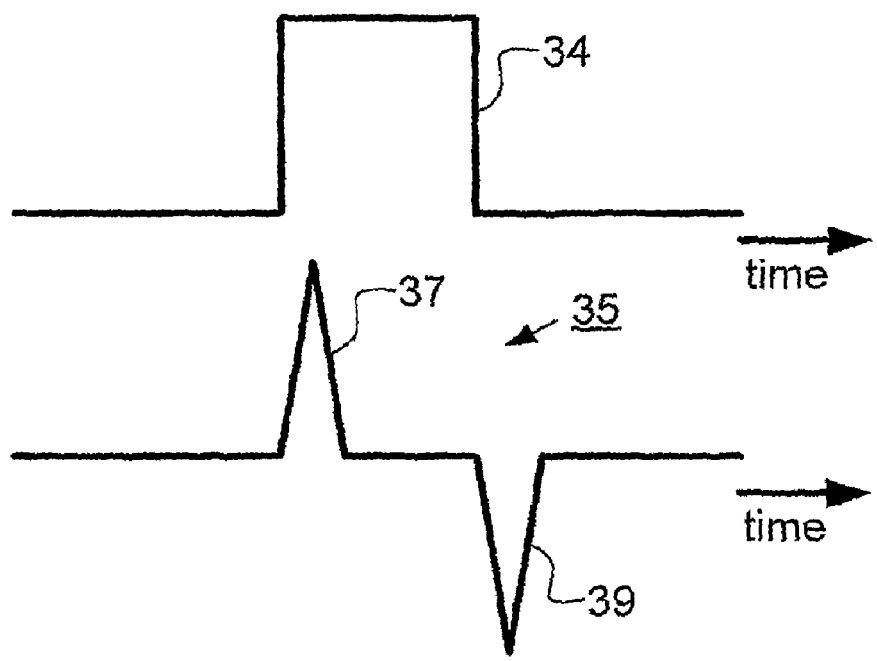
Figure 6B:
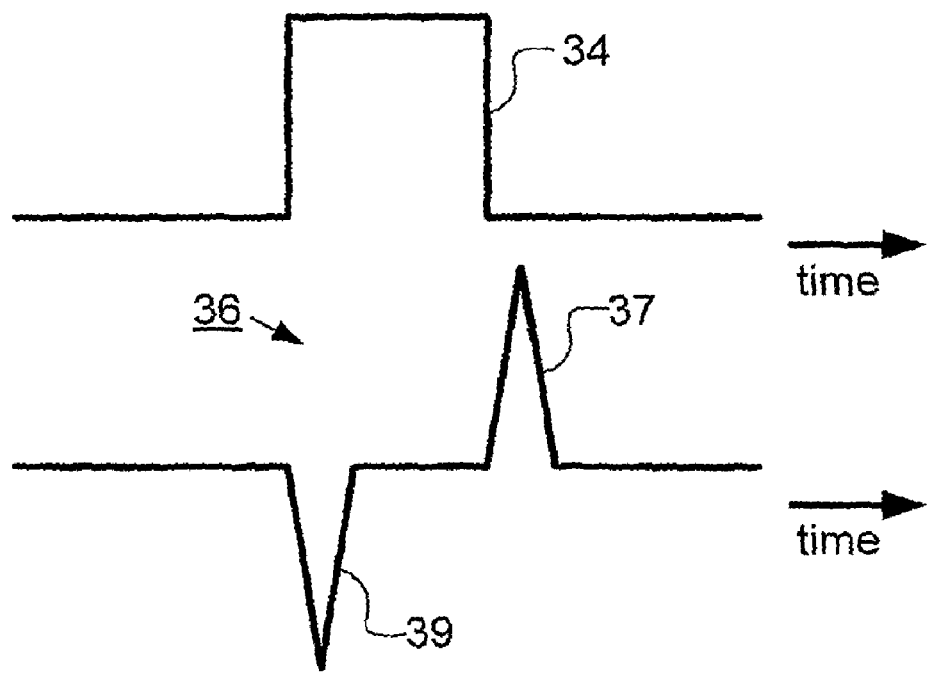
Figure 7:
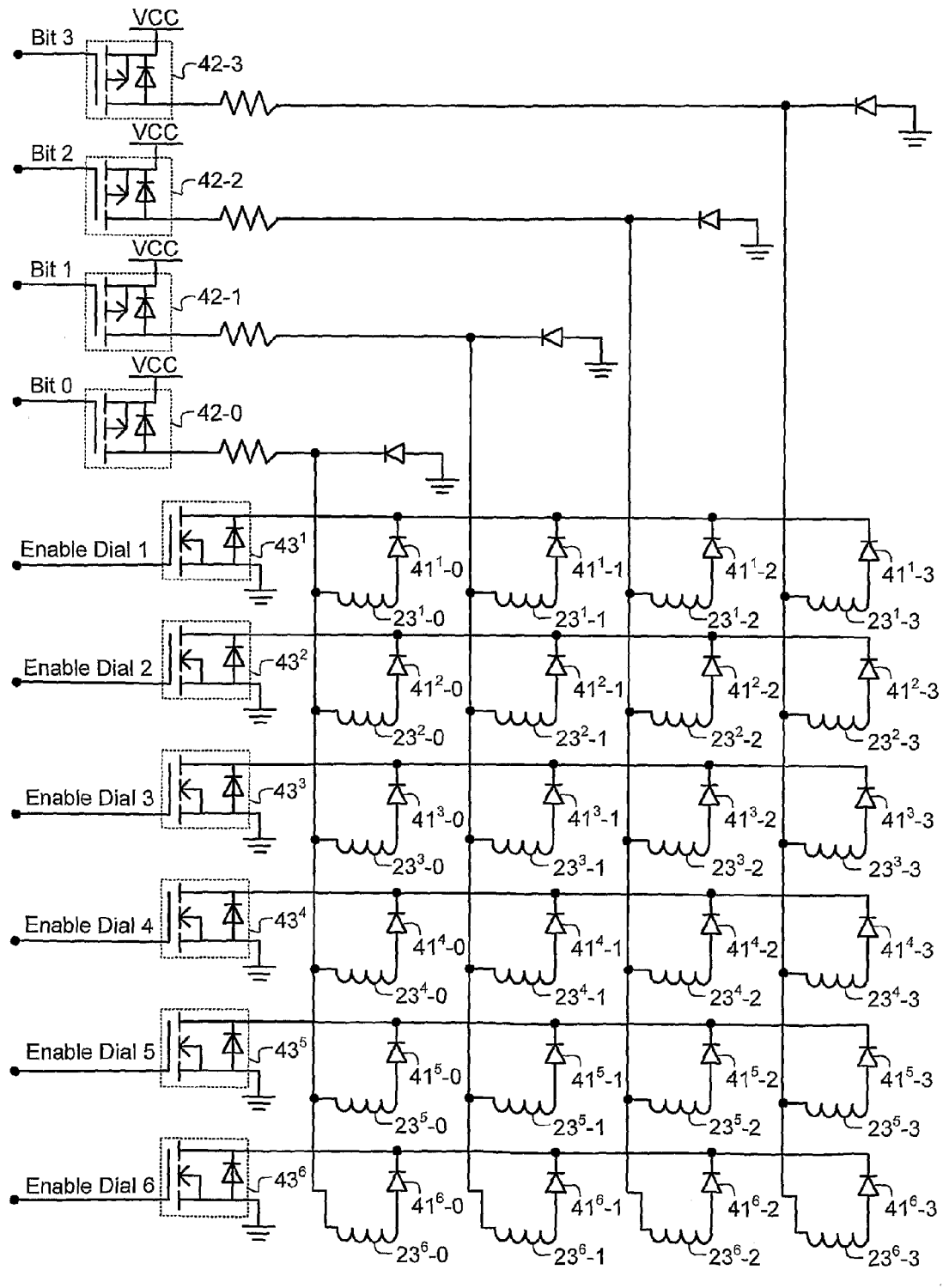

FIG. 6, which comprises FIGS. 6a and 6b, illustrates the form of an excitation pulse applied to a selected excitation winding and the form of signals received on a receive winding, depending on the position of a target carried by the dial relative to the selected excitation winding; and FIG. 7 is a circuit diagram illustrating the circuitry used to select the excitation winding to which the pulse of excitation signal is applied.

OVERVIEW

Figure 1:
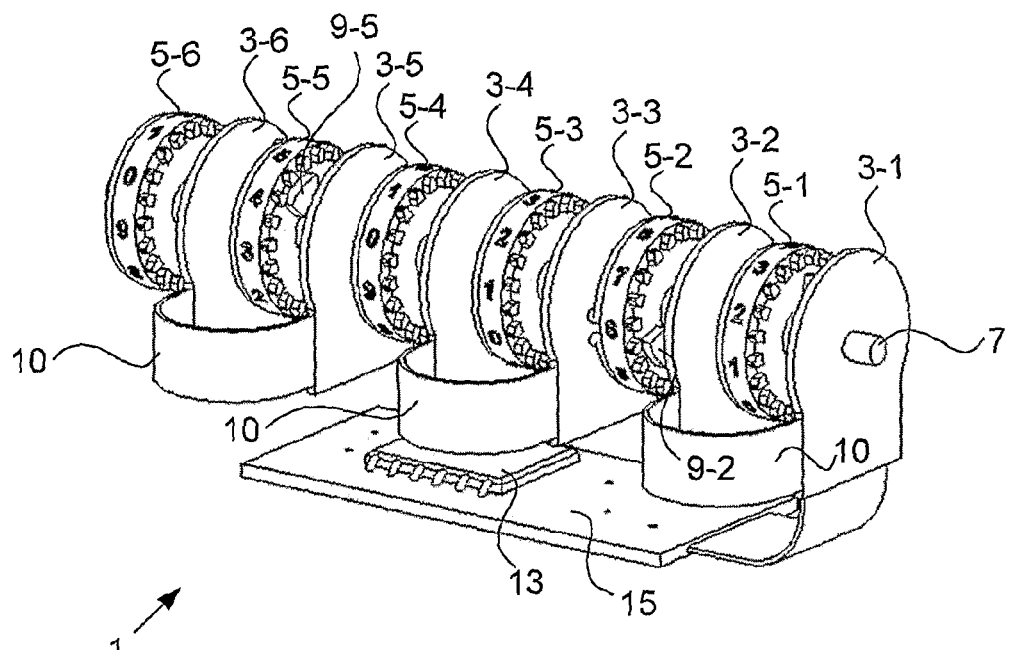
FIG. 1 is a perspective view illustrating an odometer having position encoding circuitry embodying the present invention.
Figure 2:
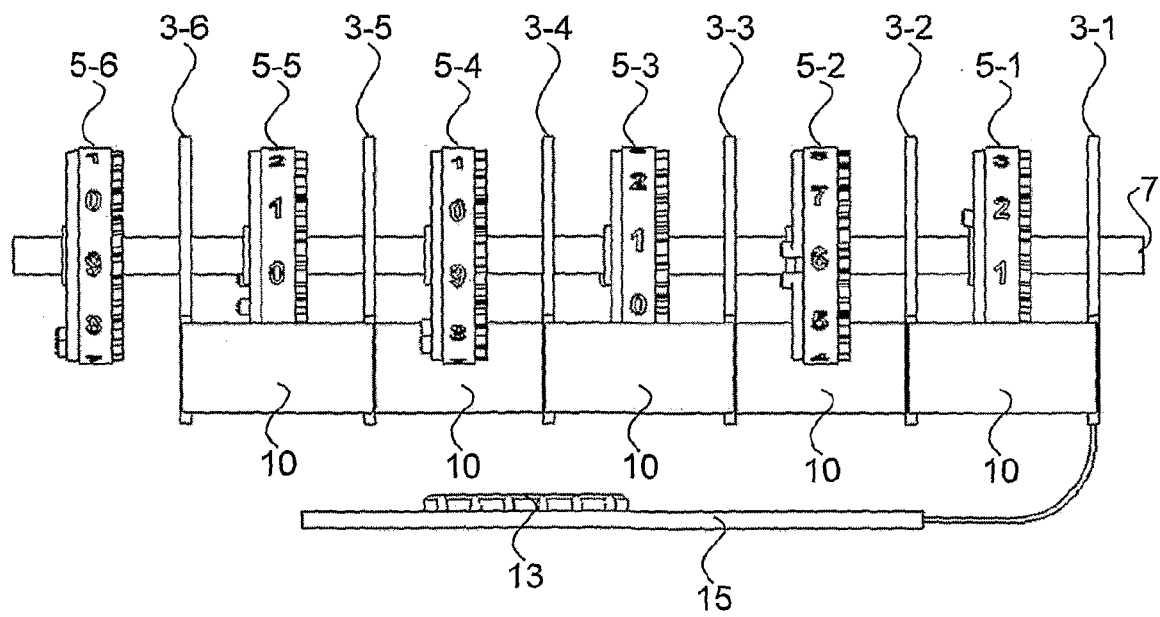
FIG. 2 is a side view of the odometer illustrated in FIG. 1.
Figure 3:
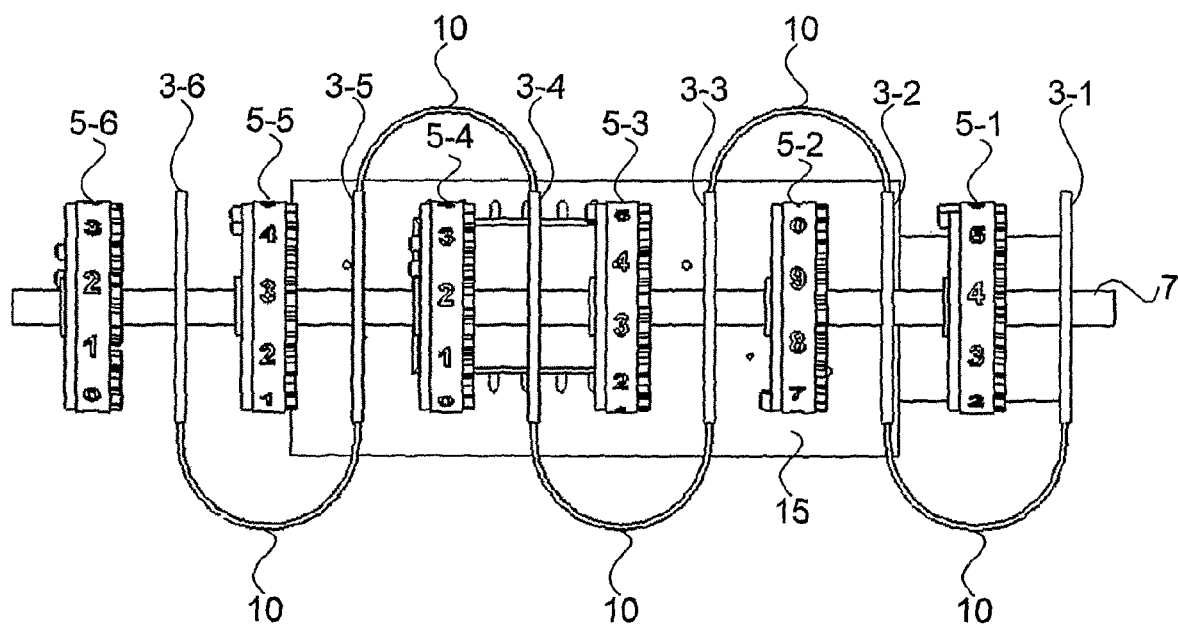
FIG. 3 is a view from above of the odometer shown in FIG. 1.

FIGS. 1 to 3 are perspective, side and plan views of an odometer 1 having six sensor boards 3-1 to 3-6 mounted adjacent a respective one of the six dials 5-1 to 5-6 forming part of the odometer 1. The dials 5 are mounted for rotation on a spindle 7, and each is marked with the digits 0 to 9 around its periphery (although there could clearly be any number of numerals around their periphery). The dials 5 are mechanically interconnected with each other in a conventional manner through a number of shift pinions (not shown), so that each time a lower digit dial 5-i rotates through one revolution, the next higher digit dial 5-i+1 is rotated by one-division on the dial. The six dial odometer 1 therefore represents a six decade counter with the six dials representing, respectively, the digits of a six digit number.

The sensor substrate 3 associated with each dial 5 is mounted to the right hand side of the dial 5 and carries a number of windings formed by patterned conductors (not shown) which interact with, in this embodiment, a conductive element that is fixed to and mounted for rotation with the associated dial 5. FIG. 1 illustrates the conductive element 9-5 that is attached to the side of dial 5-5 and the conductive element 9-2 that is attached to the side of dial 5-2. Although not essential, these conductive elements are simple un-patterned conductive elements 9 made, for example, from a conductive foil. Although not essential, the conductive elements 9 are preferably positioned adjacent the same digit on each corresponding dial 5, as this simplifies the processing required by the processing electronics. In this embodiment, flexible connectors 10 are provided for connecting the windings on the sensor boards 3 to the excitation and processing electronics 13 mounted on a sensor printed circuit board 15.

In operation, excitation signals generated by the excitation and processing circuitry 13 are applied to excitation windings carried by the sensor boards 3, which in turn generate an excitation magnetic field in the vicinity of the conductive element 9 carried by the associated dial 5. This excitation magnetic field creates Eddy currents within the conductive element 9 which in turn generates an induced voltage in a receive winding carried by the sensor board 3. The signals induced in these receive windings are then processed by the excitation and processing circuitry 13 to determine the angular position of each of the dials 5. The determined angular positions can then be stored for subsequent analysis or transmitted to a remote location for further processing or display as required.

As will be described in more detail below, in this embodiment, the windings carried by the sensor boards 3 are arranged to interact with the conductive element 9 carried by the associated dial 5 so that the signals received from each sensor board 3 vary with the angular position of the associated dial 5 in accordance with a Gray code, ie in which the binary representation of adjacent positions of the dial 5 as it rotates differs in the value of a single bit of the Gray code. In this embodiment, as each dial has 10 digits (0 to 9), the Gray code used must have at least ten states, one for each digit. Therefore, as those skilled in the art will appreciate, at least a four Bit Gray code is required as a four Bit Gray code can have up to $2^4$ (=16) states. In this embodiment, a twelve state Gray code is used as this provides slightly higher resolution than is required. Additionally, as will be described further below, the Gray code that is used in this embodiment is cyclic (ie one bit change between state 11 and state 0) and allows the windings that are encoded in accordance with the Gray code to be balanced with respect to background interference. In order to generate a four bit Gray code, four windings must be provided on each sensor board 3 whose coupling to the corresponding conductive element 9 varies with the rotation angle of the dial 5 in accordance with a respective one of the Bits in the Gray code.

The table below illustrates the twelve state Gray code that forms the basis of the winding design used in this embodiment to encode the ten positions of each of the dials 5.

| State | Analog Angle | Shifted Analog Angle | Rounded Interpretation | Bit 0 | Bit 1 | Bit 2 | Bit 3 |
|---|---|---|---|---|---|---|---|
| 0 | 0.00 | 0.00 | 0 | 0 | 1 | 1 | 0 |
| 1 | 0.83 | 0.83 | 1 | 0 | 1 | 1 | 1 |
| 2 | 1.67 | 1.67 | 2 | 0 | 0 | 1 | 1 |
| 3 | 2.50 | 2.50 | 3 | 0 | 0 | 1 | 0 |
| 4 | 3.33 | 3.33 | 3 | 0 | 0 | 0 | 0 |
| 5 | 4.17 | 4.17 | 4 | 0 | 0 | 0 | 1 |
| 6 | 5.00 | 5.00 | 5 | 1 | 0 | 0 | 1 |
| 7 | 5.83 | 5.83 | 6 | 1 | 0 | 0 | 0 |
| 8 | 6.67 | 6.67 | 7 | 1 | 1 | 0 | 0 |
| 9 | 7.50 | 7.50 | 8 | 1 | 1 | 0 | 1 |
| 10 | 8.33 | 8.33 | 8 | 1 | 1 | 1 | 1 |
| 11 | 9.17 | 9.17 | 9 | 1 | 1 | 1 | 0 |

As shown, the left hand column identifies the state of the code numbered '0' to '11', with the corresponding Gray code word given on the right hand side of the table. The second column identifies an "analog angle" which identifies a nominal angular position of that state relative to the digits around the periphery of the dial 5. The third column identifies a "shifted analog angle" which allows a calibrated angle to be added to take into account the position of the conductive element 9 relative to the digits on the dial 5 and to take into account the alignment between the windings on the sensor board 3 and the dial. This avoids the need to require the accurate placement of the sensor board relative to the dial and the accurate placement of the conductive element 9 relative to the digits on the dial 5. In this illustration, no shift angle is applied and so the shifted angle is the same as the nominal angle. Finally, the fourth column represents the rounded digit interpretation for each state in the Gray code that is obtained by rounding the shifted analog angle up or down.

Windings

Figure 4A:
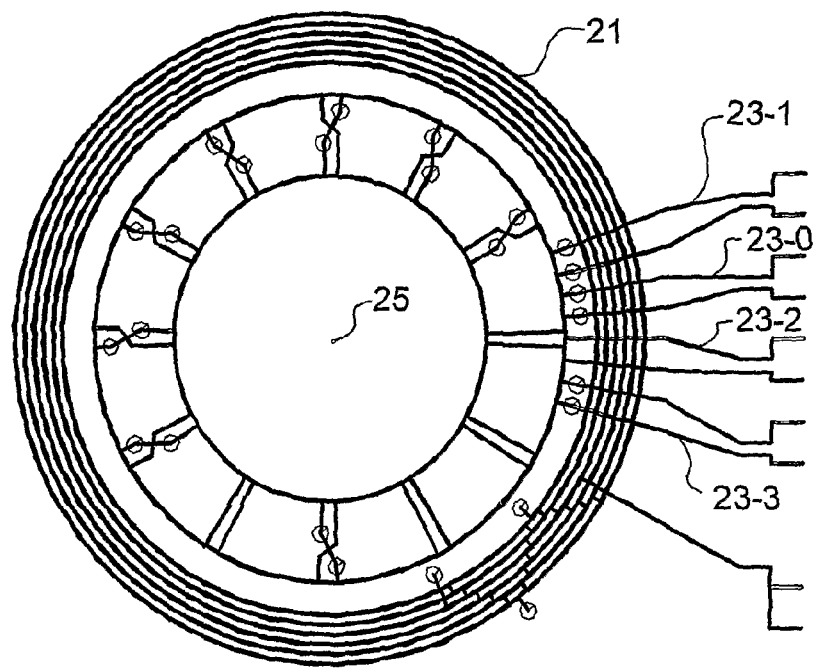
FIG. 4a illustrates a set of windings carried by each of a number of sensor boards that form part of the odometer illustrated in FIG. 1.
Figure 4B:
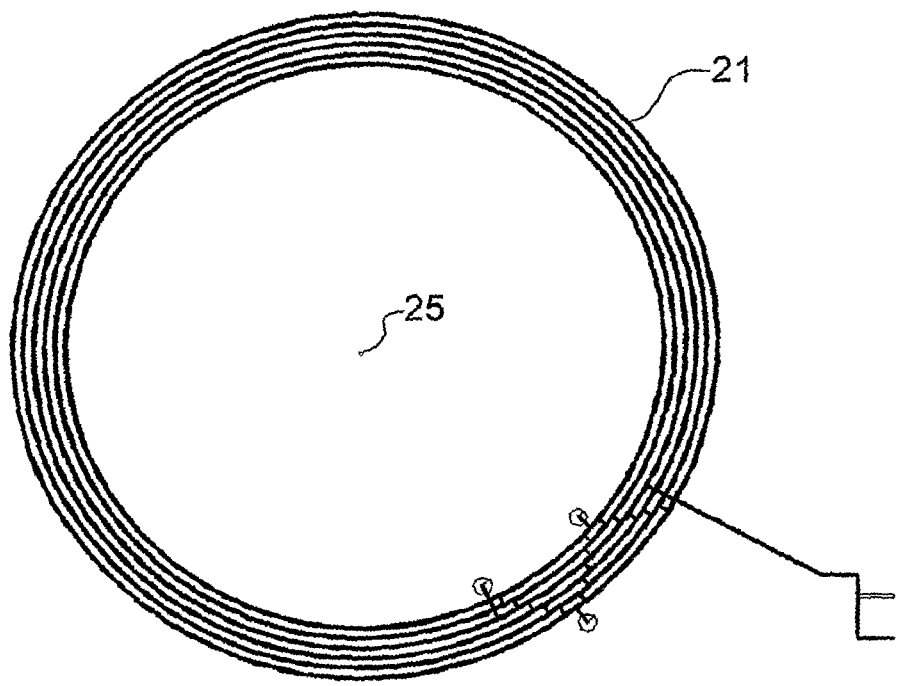
FIG. 4b illustrates the form of a receive winding carried by each of the sensor boards of the odometer shown in FIG. 1.

The way in which the windings are arranged to provide this Gray code scale variation with position will now be explained with reference to FIG. 4. FIG. 4a schematically illustrates the form of the windings that are carried by each of the sensor boards 3. In this embodiment, each sensor board 3 carries five windings which are formed by conductive tracks on four layers of a multilayered printed circuit board (PCB) 3, with appropriate connections being made between the tracks on each side by appropriate via connections. As illustrated in FIGS. 4a and 4b, the windings include a receive winding 21 which is formed from six turns of a spiral conductor on two layers of the PCB 3, with the turns on each layer being connected in series and wound in the same direction. The sensor winding 21 is mounted towards the outer edge of the sensor board 3 and is arranged so that, in use, it will have a substantially constant electromagnetic coupling with the conductive element 9 mounted on the adjacent dial 5 for all dial positions.

In this embodiment, four transmit windings 23-0, 23-1, 23-2 and 23-3 are provided in an annular region on the inside of the receive winding 21. As illustrated in FIG. 4a, the four transmit windings 23 are superimposed over each other, although they are electrically isolated from each other by the insulating layers of the sensor board 3. In this embodiment, the sensor board tracks which form these four excitation windings 23 are carried substantially in a respective different one of the four layers of the sensor board 3. FIGS. 4c, 4d, 4e and 4f illustrate the four excitation windings 23 used in this embodiment. As shown in these figures, each of the excitation windings 23 extends over an annular path centred on the axis 25 which, in use, corresponds to the axis of the spindle 7. In use, the conductive element 9 attached to the associated dial 5 rotates over a substantially coaxial annular path adjacent the excitation windings 23. As discussed above, each of the excitation windings 23 is associated with one Bit of the Gray code used to encode the position of the corresponding dial 5. In particular, excitation winding 23-0 corresponds to 'Bit 0' of the above Gray code; excitation winding 23-1 corresponds to 'Bit 1' of the above Gray code; excitation winding 23-2 corresponds to 'Bit 2' of the above Gray code and excitation winding 23-3 corresponds to 'Bit 3' of the above Gray code.

Figure 4C:
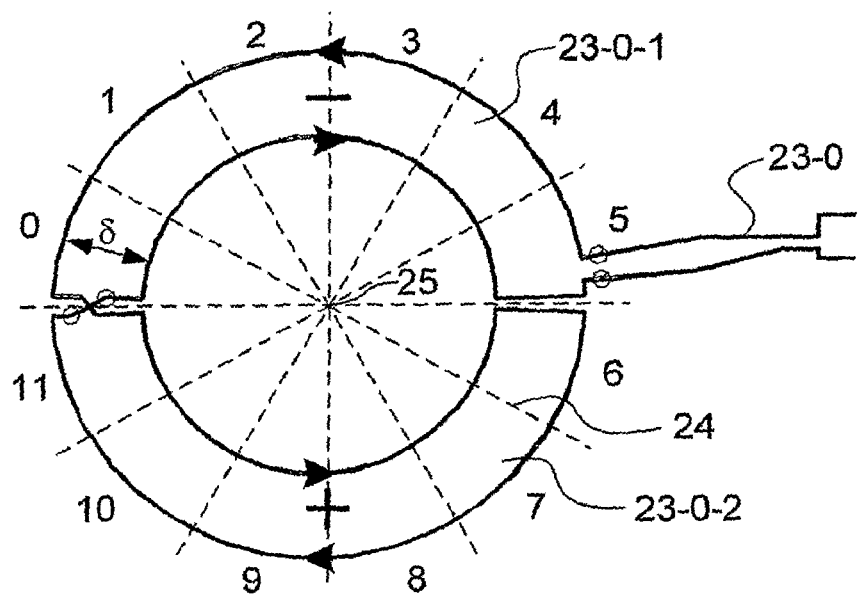
FIG. 4c illustrates the form of a first excitation winding carried by each sensor board of the odometer shown in FIG. 1.

As shown in FIG. 4c, excitation winding 23-0 is formed from two loops 23-0-1 and 23-0-2 of conductor which are connected in series in a figure of eight arrangement so that the winding direction (ie the direction of current flow when excited) of conductor loop 23-0-1 is opposite to that of conductor loop 23-0-2. The winding 23-0 thus defines two regions around the sensor board, with the boundary between the regions being defined by the locations of the change in winding direction of the loops 23-0-1 and 23-0-2. The different winding direction of the two loops 23-0-1 and 23-0-1 is represented in FIG. 4c by the '−' and '+' signs used in the figure. As a result of this figure of eight connection, when the conducting element 9 is adjacent conductor loop 23-0-1 (and an excitation signal is applied to excitation winding 23-0), it will experience an excitation magnetic field that is in the opposite direction to that experienced when it is adjacent conductor loop 23-0-2. As a result, when the conducting element 9 is adjacent conductor loop 23-0-1, the signal induced in receive winding 21 will have opposite polarity to the signal induced in sensor winding 21 when the conducting element 9 is adjacent conductor loop 23-0-2. Therefore, by assigning one polarity of the received signal as a '1' and the opposite polarity as a '0', energising winding 23-0 will produce a '0' when the conductive element 9 is positioned over the upper half of the winding 23-0 and a '1' when it is positioned over the lower half of the winding 23-0. In this embodiment, the windings 23 are designed to encode the position of the corresponding dial 5 on to a twelve state Gray code, and the correspondence between the twelve states and the positions around the dial is illustrated in FIG. 4c by the dashed lines 24. As shown, each state of the code corresponds to an angular segment or zone of the dial. Therefore, as can be seen from FIG. 4c, winding 23-0 will output a '0' when the conductive element 9 is in states 0 to 5 and a '1' in states 6 to 11. As can be seen from the table given above, this is the desired variation for 'Bit 0' of the Gray code.

Figure 4D:
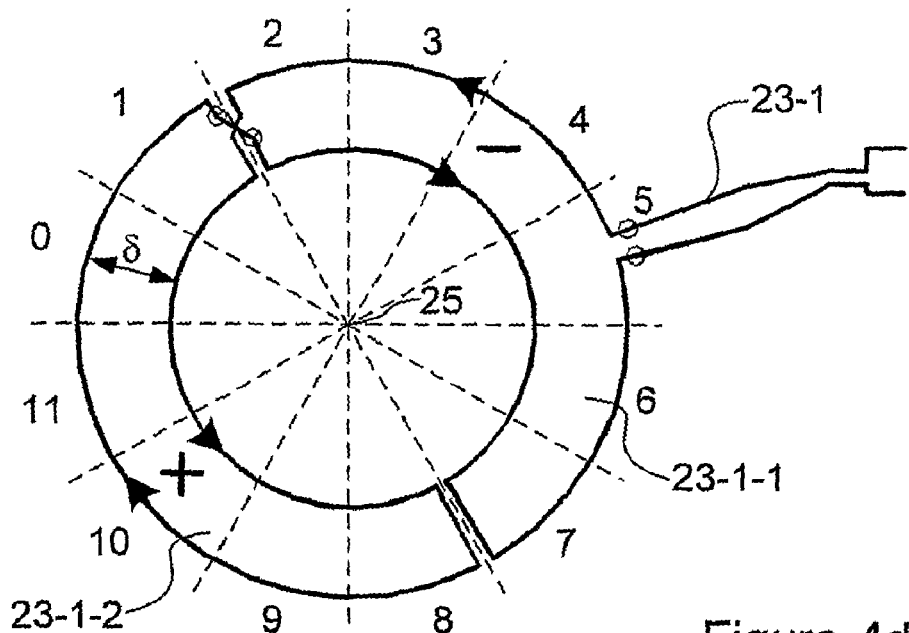
FIG. 4d illustrates the form of a second excitation winding carried by each sensor board of the odometer shown in FIG. 1.

FIG. 4d illustrates the form of the excitation winding 23-1. As can be seen, excitation winding 23-1 has a similar form to excitation winding 23-0, except the two conductor loops 23-1-1 and 23-1-2 are rotated clockwise through an angle of approximately 60 degrees, corresponding to two states of the Gray code. Therefore, as can be seen from FIG. 4d, winding 23-1 will output a '0' when the conductive element 9 is in states 2 to 7 and a '1' in states 8 to 11, 0 and 1. As can be seen from the table given above, this is the desired variation for 'Bit 1' of the Gray code.

Figure 4E:
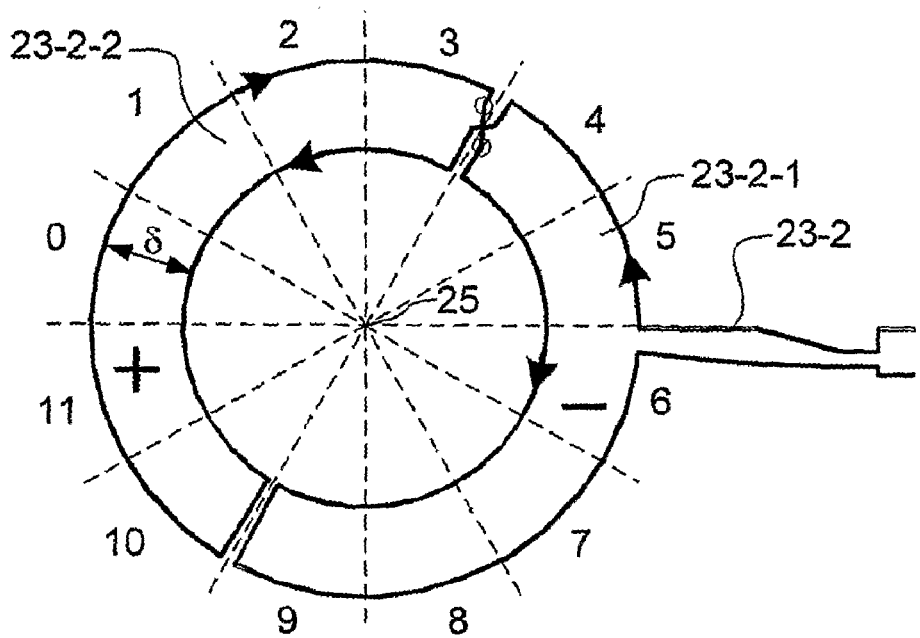
FIG. 4e illustrates the form of a third excitation winding carried by each sensor board of the odometer shown in FIG. 1.

FIG. 4e illustrates the form of the excitation winding 23-2. As can be seen, excitation winding 23-2 has a similar form to excitation ending 23-0, except the two conductor loops 23-2-1 and 23-2-2 are rotated clockwise through an angle of approximately 120 degrees, corresponding to four states of the Gray code. Therefore, as can be seen from FIG. 4e, winding 23-2 will output a '0' when the conductive element 9 is in states 4 to 9 and a '1' in states 10, 11 and 0 to 3. As can be seen from the table given above, this is the desired variation for 'Bit 2' of the Gray code.

Figure 4F:
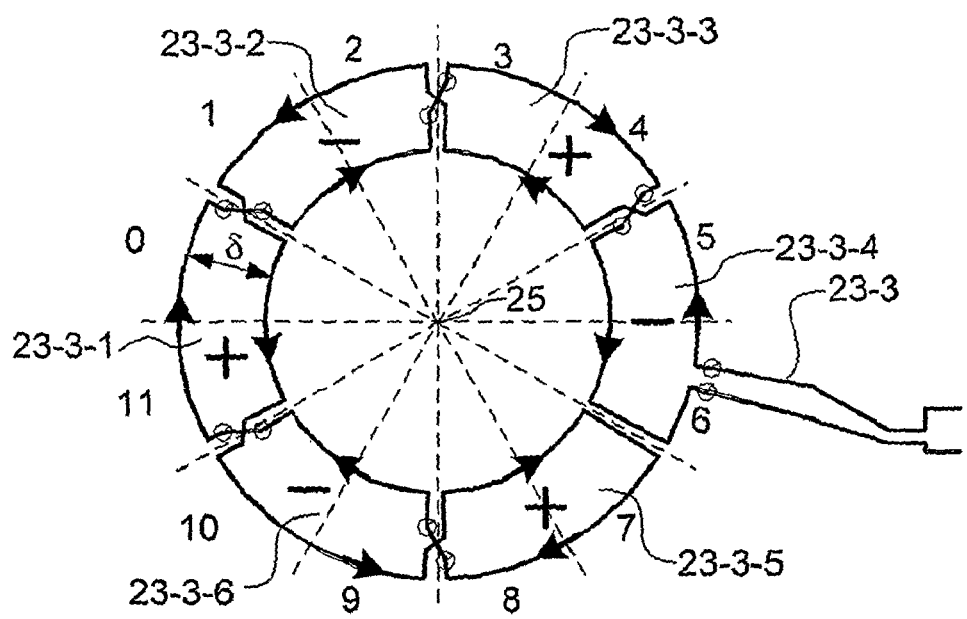
FIG. 4f illustrates the form of a fourth excitation winding carried by each sensor board of the odometer shown in FIG. 1.

FIG. 4f illustrates the form of excitation winding 23-3 used in this embodiment. As shown, excitation winding 23-3 is formed from six conductor loops 23-3-1 to 23-3-6 which are connected in series with adjacent loops being wound in the opposite direction. Thus sensor winding 23-3 defines six regions around the sensor board, with the boundaries between the regions being defined by the locations of the changes of winding directions. As shown in FIG. 4f, each of these six loops extends over an arc of approximately 60 degrees, corresponding to two states of the Gray code. As illustrated by the polarity of these loops, winding 23-3 will output a '0' when the conductive element 9 is in states 0, 3, 4, 7, 8 and 11 and a '1' in states 1, 2, 5, 6, 9 and 10. As can be seen from the table given above, this is the desired variation for 'Bit 3' of the Gray code.

Thus, as can be seen from FIGS. 4c, 4d, 4e and 4f, each winding 23 defines a plurality of regions around the sensor board 3, with the boundaries between the regions of the different windings 23 being located at different locations around the sensor board 3. In fact, as can be seen from FIG. 4a, the boundaries between all the regions of all the windings 23 effectively define the zones that correspond to the states of the Gray code. As shown, in this embodiment, the zones all have the same size and correspond to an arc of 60 degrees (as shown by the lines 24 in FIG. 4c).

In this embodiment, the diameter of the dials 5 and the sensor boards 3 is approximately 20 mm and the separation between one dial and the sensor board of the adjacent dial is approximately 0.5 mm. With the figure of eight type of windings 23 being used in this embodiment, the typical sensing range (ie between the windings 23 and the conductive element 9) of the windings 23 is approximately equal to either the narrowest dimension of the windings 23 or the narrowest dimension of the conducting element 9, whichever is the smaller. With the windings 23 shown in FIG. 4, this corresponds to the radial width (δ) which, in this embodiment, is approximately the same for all of the windings 23 and is approximately 4 mm. As a result, the conductive elements 9 mounted on adjacent dials 5 will be out of range of the windings 23 on each sensor board 3. For example, the sensed output for sensor board 23-1 will be affected by adjacent conductive element 9-1 and not conductive elements 9-0, 9-2, 9-3, 9-4, 9-5 which will be out of sensing range.

Excitation and Processing Electronics

Figure 5:
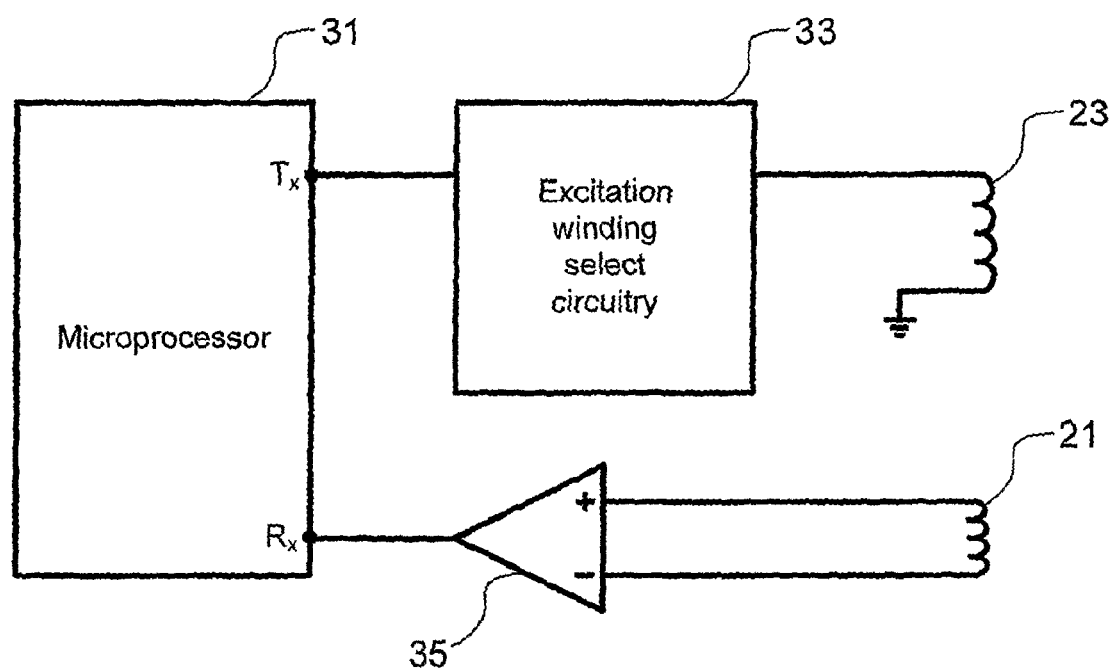
FIG. 5 illustrates the excitation and processing circuitry used to electronically detect the position of the dials of the odometer shown in FIG. 1.

FIG. 5 is a block diagram illustrating the main components of the excitation and processing circuitry used in the present embodiment to drive the excitation windings 23 and to process the signals obtained from the receive winding 21. As shown, the circuitry includes a microprocessor 31 which is programmed to generate pulses of excitation signal which are output to excitation winding select circuitry 33. The winding select circuitry 33 is used to select one of the excitation windings 23 on one of the sensor boards 3 to which a pulse of excitation signal is to be applied. The microprocessor 31 controls the select circuitry 33 so that each of the excitation windings 23 on each sensor board 3 is selected and energised in turn. The signals generated in the receive winding 21 in response to the application of the excitation signal to the selected excitation winding 23 is input to the microprocessor 31 via a differential amplifier 35. In this embodiment, the receive windings 21 on all of the sensor boards 3 are connected in series with each other and thus provide a common receive winding for all the dials 5. However, as the excitation windings 23 are selected and energised one at a time, the signals induced in the receive winding 21 will be received at different times and can be processed by the microprocessor 31.

FIGS. 6a and 6b illustrate the form of the excitation pulse 34 applied to the selected excitation winding 23 and the resulting response that is obtained from the receive winding 21, depending on the position of the conductive element 9 relative to the loops of the selected excitation winding 23. In this embodiment a pulse of excitation signal of about 2 μs, 3 v and 100 mA was used resulting in a received signal of about 2 mV peak. In particular, FIG. 6a illustrates the form of the signal 35 obtained from the receive winding 21 when the conductive element 9 is located adjacent to a loop of the selected excitation winding 23 that has current flowing in a clockwise direction and FIG. 6b illustrates the form of the signal 36 obtained from the receive winding 21 when the conductive element 9 is located adjacent to a conductor loop that has current flowing in an anticlockwise direction. For example, if the selected excitation winding is winding 23-0 shown in FIG. 4c, then the response signal 35 shown in FIG. 6a will be obtained when the conductive element is positioned adjacent loop 23-0-2 and the response signal 36 shown in FIG. 6b will be obtained when the conductive element 9 is located adjacent loop 23-0-1. Therefore, the microprocessor 31 can process the signal 35 or 36 obtained from the receive winding 21 to determine whether the conductive element 9 is adjacent to loop 23-0-1 or loop 23-0-2. This may be achieved either by detecting the timing at which a positive spike 37 is received relative to the timing of the excitation pulse or by detecting if a positive spike 37 is received before or after a negative spike 39. The microprocessor 31 then sets the value of the code bit associated with the selected excitation coil 23 to a value of '1' or '0' depending on the determination thus made.

By selecting the other transmit coils 23 on the same sensor board 3, the microprocessor 31 can determine the other bit values of the Gray code for the current position of the corresponding dial 5. The microprocessor 31 then effectively compares this code word with the table given above to identify the position of this Gray code word within the overall sequence and hence the current position of the dial 5. However, when a dial 5 is in transition between adjacent states, then one bit will not register as being above the detection threshold. This is because, when a dial is in transition between adjacent states, there is a small range of angles where the conductive element 9 will straddle a crossover of one of the excitation windings 23, ie where the winding direction of one of the windings 23 changes. When this happens, the strength of the received signal (ie the height of the pulses 37 and 39) that is obtained when that excitation winding 23 is energised, will be much lower than the signal strengths obtained when the other excitation windings 23 are energised and neither of the received pulses 37 or 39 for that excitation winding 23 will exceed the threshold.

This allows the microprocessor 31 to be able to determine when the dial 5 is between two consecutive states in the Gray code sequence. For example, if a dial 5 reads '0001' then, as can be seen from the above table, this corresponds to a "4". If the dial is in transition and the reading is now '000x' where x represents the fact that 'Bit 3' did not cross the threshold, then this means that the dial 5 is in transition between a "3" and a "4". If, however, the reading was 'x001' then this means that the dial 5 is in transition between a "4" and a "5". Hence, by using a Gray code, the microprocessor 31 can unambiguously detect when each dial 5 is located adjacent each state or is in a transition between adjacent states.

By reading all of the dials 5 in this way, the microprocessor 31 can determine the position of all of the dials 5 and thus the six digit number represented by the dials 5. The microprocessor 31 can then store this information for subsequent use or can transmit it to a remote location (not shown), for example, for billing purposes.

Coil Select Circuitry

In the above embodiment, the pulse of excitation signal was applied to a selected one of the excitation windings 23 mounted on one of the sensor boards 3. As those skilled in the art will appreciate, there are various ways in which this selection can be achieved. FIG. 7 is a circuit diagram illustrating one way in which this can be achieved through the use of diodes 41 mounted on the sensor boards 3, and transistor and diode circuits 42 and 43 to enable a selected excitation winding 23. In FIG. 7, the excitation windings 23 mounted on each sensor board 3 are arranged in a row. Thus, the excitation windings $23^1$-0 to $23^1$-3 mounted on sensor board 3-1 are provided in the first row; the excitation windings $23^2$-0 to $23^2$-3 mounted on the second sensor board 3-2 are provided in the second row etc. Each of the 'Bit 0' windings, i.e. windings $23^1$-0, $23^2$-0 . . . $23^6$-0 are all driven by a common drive line from transistor and diode circuit 42-0 which is controlled by the 'Bit 0' control line. The other end of these windings are connected to a respective one of the transistor and diode circuits $43^1$, $43^2$, $43^3$ . . . $43^6$ which are controlled by a respective one of six dial enable control lines labelled "enable dial 1", "enable dial 2", "enable dial 3", etc. A similar arrangement is provided for all of the 'Bit 1' excitation windings $23^1$-1 to $23^6$-1; all of the 'Bit 2' excitation windings $23^1$-2 to $23^6$-2; and all of the 'Bit 3' excitation windings $23^1$-3 to $23^6$-3. Thus, by setting one of the dial enable control lines and pulsing one of the Bit control lines, one of the excitation windings 23 will be energised with a pulse of excitation current. The other excitation windings will not be energised. As those skilled in the art will appreciate, by mounting the diodes 41 on the sensor boards 3, the connections to the excitation windings 23 can be made by ten conductor tracks that are carried by the flexible connectors 10 (shown in FIG. 1).

In this embodiment, the microprocessor 31 controls the reading process as follows:
1—Set Enable Dial 1 high, all other Enable lines low
2—Set 'Bit 0' transmit low (to close the switch of circuit 42-0)
3—check latching comparator (used to detect the positive spikes) for a positive signal
4—set 'Bit 0' transmit high (to open the switch of circuit 42-0)
5—check latching comparator for positive signal
6—change to 'Bit 1' transmit and repeat process
7—repeat for all Bit transmit lines
8—change to dial 2 and repeat the process
9—repeat for all dials Thus, after each rising and falling edge of each excitation pulse, the microprocessor 31 uses a latching comparator to compare the signal received from the receive winding 21 with a positive threshold value. If it is greater than the threshold, then it determines that the received peak is a positive peak. The microprocessor 31 then determines the bit value depending on whether it detects the positive spike in step 3 or in step 5.

Rollover

One of the difficulties with reading odometers such as the one illustrated in FIG. 1 is that when several dials change state together (e.g. when the value changes from 012399 to 012400) they are not normally synchronised exactly. When an odometer is in this 'rollover' state, the electronics and subsequent processing must be capable of discerning between 'legitimate' values (in this example 012399 and 0123400) and 'illegitimate' values (in this example 012499, 012409, 012490, 012300, 012309, or 012390).

In general, rollover situations can be unambiguously read by having sufficient angular resolution in the measurement path. A resolution of better than 0.5—tolerance—backlash for an odometer of 10 digit wheels is considered sufficient to those skilled in the art to determine, in a simple manner, the rollover reading. When there are less zones than this available, an alternative approach can be used.

As discussed above, when a dial 5 is in transition between adjacent states, there is a small range of angles where the conductive element 9 will straddle a crossover of one of the excitation windings 23. If a low voltage threshold is used then there is a small range of angular positions where the dial 5 is determined to be in a transition, and if the threshold voltage is increased, then there is a wider range of angular positions where the dial 5 is determined to be in a transition. This property of the encoder may be used to resolve 'rollover' readings correctly.

The existence of a 'rollover' state is first determined by testing whether any of the dials 5 is at the transition between '9' and '0'. When a 'rollover' state is thus detected by the reading of any dial 5 being identified as being a "9" or "0", the microprocessor 31 firstly reads the dial immediately to its left normally (in the manner discussed above) and then reads the same dial (the left hand one) again using a higher threshold value in the comparison with the received signal. If the left hand dial is not at a transition, but is close to a transition then the higher threshold used for the second read gives a wider range of angular positions for which the received signal pulses 37 or 39 for an excitation winding 23 fall below the threshold. In this way the microprocessor 31 is able to establish whether the left hand dial is also close to a transition and is therefore able to reject any 'illegitimate' odometer values which may otherwise occur due to electrical noise, mechanical misalignment between adjacent dials, or other departures from ideal behaviour.

For example, a right hand dial 5-$i$ reads "9" and on a normal reading the left hand dial 5-$i$+1 reads '0001' which corresponds to a "4". If the left hand dial 5-$i$+1 is read again with a higher threshold and the reading is now '000x' where x represents the fact that 'Bit 3' did not cross the higher threshold, then this means that the dial 5-$i$+1 is going between a "3"

and a "4". If, however, the high threshold reading was 'x001' then this means that the dial 5-*i*+1 is going between a "4" and a "5".

As those skilled in the art will appreciate, an inductive position encoder has been described above that is simple and relatively inexpensive to make. It relies on simple PCB technology to define the windings used for reading the positions of the dials and uses a simple technique to interrogate and process the signals that are obtained from the interrogation.

MODIFICATIONS AND ALTERNATIVES

In the above embodiment, the receive windings 21 on the six sensor boards 3-1 to 3-6 were connected in series and connected to the microprocessor 31 via a differential amplifier 35. One potential disadvantage with this arrangement is that the receive windings 21 will be susceptible to electromagnetic interference as the receive windings 21 on the sensor boards 3-1 to 3-6 are all wound in the same direction and connected in series with each other. In order to reduce this interference, another set of windings positioned away from (ie out of range of) the dials 5 and wound in the opposite direction to the receive windings 21 may be connected in series with the receive windings 21 in order to cancel out the effects of any common background electromagnetic interference. Alternatively, instead of connecting the receive windings 21 on the six different sensor boards 3 in series such that all of the receive windings 21 are wound in the same direction, three of the six receive windings 21 may be connected so that their winding direction is opposite to the winding direction of the other three receive windings 21. In this way, the receive windings 21 as a whole will be balanced with respect to any common background electromagnetic interference. However, as those skilled in the art will appreciate, in view of the opposite winding direction of those three receive windings 21, the signals obtained from those three receive windings 21 (or the bit values obtained from those signals) will have to be inverted. However, this is a trivial task that can be performed, for example, within the microprocessor 31. In such an embodiment, the receive windings 21 mounted on sensor boards 3-1, 3-3 and 3-5 are preferably wound in one direction (eg clockwise) and the receive windings 21 mounted on sensor boards 3-2, 3-4 and 3-6 are preferably wound in the opposition direction (eg anticlockwise).

In the first embodiment described above, four common drive lines were provided for energizing the different excitation windings 23. In an alternative embodiment, separate drive lines may be provided directly from a multiplexer located on the sensor board 15 to each of the excitation windings 23 mounted on the sensor boards 3. However this significantly increases the number of connections that have to be made over the flexible connectors 10 that connect each sensor board 3 with the excitation and processing sensor board 15.

In the above embodiment, each dial 5 carried a conductive element 9. In use, this conductive element interacted with the electromagnetic field generated by the energized excitation winding 23 to induce a signal in the receive winding 21 that varied in dependence upon the relative position between the conductive element 9 and the excitation winding 23 that generated the excitation electromagnetic field. As those skilled in the art will appreciate, other magnetic devices may be used to interact with the excitation electromagnetic field in a similar manner. For example, instead of using a conductive element, the magnetic device may be: a short circuit coil, an element made of ferrite, a resonator, such as a coil and capacitor LC circuit, a conductor having a hole in it or an inhomogeneity in a magnetic film caused by, for example, a magnet in its vicinity. Further still, if wires are provided to each dial, the winding 21 can be dispensed with. For example, if a powered coil is provided on each dial, then the direct coupling between each powered coil and the windings 23 can be determined. Similarly, if a coil is mounted on each dial and connected back to the processing electronics, then again the direct coupling between these coils and the windings 23 can be determined by energising the windings 23 and processing the signals obtained from the coils mounted on the dials. As those skilled in the art will appreciate, whilst the provision of wires to each dial is possible, it is not preferred due to the resulting complexity.

In the above embodiment, single polarity pulses 34 were applied to a selected one of the excitation windings 23, with the other end of the selected excitation winding 23 being connected to ground through the appropriate transistor and diode circuit 43. In an alternative embodiment, pulses of opposite polarity may be applied to each end of the selected excitation winding 23. This arrangement is preferred as it minimizes capacitive coupling between the selected excitation winding 23 and the receive winding 21.

In the above embodiment, the excitation windings 23 mounted on the sensor boards 3 were designed for the specific Gray code illustrated in the table given above. As those skilled in the art will appreciate, there are a large number of different Gray codes that can be used and the layout of the windings 23 will have to be changed to obtain the particular Gray code to be implemented. The design of the windings 23 is preferably performed by firstly defining the Gray code and then, for each Bit of the code locating the states where it changes from a '1' to a '0' or vice versa. The winding 23 corresponding to that Bit can then be designed by arranging the loops that form the winding 23 so that there is a change of winding direction of the loops at the locations around the sensor board 3 corresponding to the boundary between the states where there is a change from a '1' to a '0' or vice versa.

In the above embodiment, a Gray code having 12 states was used to define the design of the excitation windings 23. As those skilled in the art will appreciate, instead of using 12 states, it would be possible to use a Gray code having just 10 states so that there is a one to one mapping between the states of the Gray code and the digit positions on the dial 5. However, it is preferred to have more states in the Gray code than there are digits on the dial in order to increase the accuracy of the position calculations. Further, as the number of states in the Gray code increases, the more complex is the design of the excitation windings 23, especially when the Gray code is to be cyclic (i.e. so that the transition from the last state to the first state also only includes a single bit transition in the code word).

In the above embodiments, the excitation and processing circuitry 13 was arranged to apply excitation pulses to a selected excitation winding 23 and the signals generated in the receive winding 21 were processed to determine the angular position of each dial 5. In an alternative embodiment, the roles of the excitation and receive windings can be reversed such that the excitation signal is applied to the winding 21 and separate receive signals are generated in each of the windings 23-0 to 23-3. In such an embodiment, each of the windings 23 may be individually connected back to the microprocessor 31 via conditioning electronics. This is advantageous as the signals required to read the positions of all the dials 5 will be available from a single excitation of the common excitation winding 21. However, in order to reduce the number of these connections and the amount of conditioning electronics, the signals obtained from the windings 23 are preferably multiplexed through an appropriate multiplexer. For example, in such an embodiment, the winding 21 on each sensor board 3 may be energized once for each of the windings 23-0 to 23-3, with a different one of the windings 23 being connected through the multiplexer to the microprocessor 31 on each energisation.

When selecting a Gray code to use to design the layout of the windings 23, Gray codes are preferably used which form windings 23 that have essentially zero dipole moment. When the windings 23 are used as receive windings, they will thus be substantially balanced with respect to any background electromagnetic interference. When the windings 23 are used as transmitters, they generate negligible emissions outside the immediate surroundings of the inductive sensor. This is achieved by making the number of 0's equal to the number of 1's in each Bit of the code. This is illustrated in the Table 1 for the code used in the first embodiment. In particular, as can be seen from Table 1, 'Bit 0' is a '0' six times and a '1' six times. Similarly 'Bit 1' is a '0' six times and a '1' six times; 'Bit 2' is a '0' six times and a '1' six times; and 'Bit 3' is a '0' six times and a '1' six times. This arrangement is also advantageous as it means that the windings 23 will have substantially no net electromagnetic coupling with winding 21 in the absence of the conductive element. This is because, any direct coupling between the winding 21 and the loops of the windings 23 which are wound in one direction will cancel out with any coupling between the winding 21 and the loops of the windings 23 that are wound in the opposite direction. This means that the conductive element 9 (or other magnetic device) is acting to disturb the balance between the winding 23 and the windings 21.

As those skilled in the art will appreciate, if the windings 23 are designed based on a different Gray code in which some of the bits have more 0's than 1's then using that Gray code may result in there being a direct coupling between the windings 23 and the winding 21. As those skilled in the art will appreciate, this approach is not preferred as it means more complicated processing in order to differentiate between the signal that is generated in the receive winding by direct coupling between the excitation and receive windings and the signal that is generated in the receive winding due to the operation of the conductive element 9 (or other magnetic device). Alternatively, if a Gray code is used that will result in unbalanced windings 23, one or more additional loops can be connected to those windings 23 which do not interact with the conductive element 9 (or other magnetic device) but which still couple with the receive winding 21. For example, these one or more additional loops may be positioned towards the centre 25 of the sensor board 3. As these additional loops are positioned away from the annular region adjacent to which the conductive element 9 (or other magnetic device) is arranged to move, there will be substantially no electromagnetic coupling between these additional loops and the magnetic device. However, these additional loops will still couple with the receive winding 21 and can therefore be designed to ensure that (in the absence of the conductive element 9 or other magnetic device) there is no overall net coupling between the windings 21 and that winding 23.

In the above embodiment, the windings 23 were arranged on the sensor board 3 in accordance with a binary Gray code pattern. As those skilled in the art will appreciate, it is possible to design the windings 23 in accordance with an n-ary Gray code. This may be achieved, for example, by varying the number of turns of conductor used to define the different loops that make up each winding 23. For example, for a ternary Gray code, a '0' of the code may be represented by a loop formed from a single turn that is wound in one direction; a '1' of the code may be represented by a loop formed from a single turn that is wound in the opposite direction; and a '2' of the code may be represented by a loop wound in either direction but formed from two or more turns of conductor. In such an embodiment, the microprocessor 31 will be able to detect if the current position corresponds to a '0', a '1' or a '2' from the polarity of the received signals and from the amplitude of the received signals (as the multi-turn loop will produce larger signal levels than the single turn loops). Similarly, in a binary Gray code system, instead of using different winding directions to differentiate a '1' and a '0', this could be achieved by using loops having a first number of turns to represent a '1' and loops having a second different number of turns to represent a '0'. With such an arrangement, the microprocessor can differentiate between a '1' and a '0' from the amplitude of the received signals. Alternatively still, the different levels could be obtained from different areas of loops rather than different numbers of turns.

In the above embodiments, a relatively simple excitation and detection process was used to detect the position of the different dials 5. As those skilled in the art will appreciate, other techniques for exciting the excitation windings 23 and for processing the signals received from the receive winding 21 may be used. For example, a continuous AC signal may be applied to the selected excitation winding and the amplitude, phase or frequency of the detection signal may be processed to recover the position information. The way in which this can be achieved will be well known to those skilled in the art and will not be described in further detail here.

In the above embodiment, the position of each dial 5 was read sequentially because a common receive winding was used. If the receive windings 21 are separately connected to the microprocessor 31 then one excitation winding 23 on each sensor board 3 can be energised at the same time and the signals obtained on the different receive windings 21 can be processed together, thereby reducing the time required to obtain a reading. Similarly, if a resonator is used as the magnetic device on each dial 5, with each having a different resonant frequency, then it would also be possible to use a common receive winding whilst energising one excitation winding on each sensor board 3 at the same time. Although this is possible, it is not preferred, as it increases the complexity of the processing electronics.

In the above embodiment, single pulses 34 of excitation signal were applied to each of the excitation windings 23 in turn. The signal generated in the common receive winding 21 was then processed to identify if the response included a positive spike followed by a negative spike or a negative spike followed by a positive spike. In an alternative embodiment, the signal obtained from the receive winding 21 may be integrated with the result either being positive or negative, depending on the position of the dial 5 relative to the excitation winding 23.

In the above embodiment, a set of windings 23 were provided that were designed based on a Gray code. This provides the advantage of only a single bit changing at each state transition in the code, which in turn reduces the likelihood of errors in the measurement results. As those skilled in the art will appreciate, alternative coding schemes can be used in which the transmit and receive coils are balanced with respect to each other and the position is unambiguous through state transitions and the signal strength remains substantially constant within each measurement zone. Such codes can be formed, for example, by taking a 12 state Gray code and omitting 2 states to create a 10 state code, so that, for example there is a one to one mapping between the states of the code and the positions of the digits on the dial. However, by doing this, the resulting code will have two state transitions where 2 bits change simultaneously. In the remaining eight states, however, there will still be a single bit change between states and the above advantages are thus still achieved for at least the majority of the states of the code. Additionally, by ensuring that the possible codes that may be erroneously detected do not correspond to the code words of other states, the position can still be unambiguously decoded. For example Table 2 below shows a 12 state Gray code which has an equal number of 1's and 0's for each Bit (ie it will be balanced) and which unambiguously decodes the transitions between states.

TABLE 2

| Rounded Interpretation | State | Bit 0 | Bit 1 | Bit 2 | Bit 3 |
|---|---|---|---|---|---|
| 0 | 0 | 0 | 0 | 1 | 0 |
| 1 | 1 | 0 | 0 | 1 | 1 |
| 2 | 2 | 0 | 0 | 0 | 1 |
| 3 | 3 | 0 | 1 | 0 | 1 |
| 3 | 4 | 0 | 1 | 1 | 1 |
| 4 | 5 | 0 | 1 | 1 | 0 |
| 5 | 6 | 1 | 1 | 1 | 0 |
| 6 | 7 | 1 | 1 | 0 | 0 |
| 7 | 8 | 1 | 1 | 0 | 1 |
| 8 | 9 | 1 | 0 | 0 | 1 |
| 8 | 10 | 1 | 0 | 0 | 0 |
| 9 | 11 | 1 | 0 | 1 | 0 |

If state 1 and state 7 in table 2 are omitted from the code the result is a 10 state code that can be unambiguously decoded and remains balanced (see Table 3 below).

TABLE 3

| Rounded Interpretation | New State | Bit 0 | Bit 1 | Bit 2 | Bit 3 |
|---|---|---|---|---|---|
| 0 | 0 | 0 | 0 | 1 | 0 |
| 1 | 1 | 0 | 0 | 0 | 1 |
| 2 | 2 | 0 | 1 | 0 | 1 |
| 3 | 3 | 0 | 1 | 1 | 1 |
| 4 | 4 | 0 | 1 | 1 | 0 |
| 5 | 5 | 1 | 1 | 1 | 0 |
| 6 | 6 | 1 | 1 | 0 | 1 |
| 7 | 7 | 1 | 0 | 0 | 1 |
| 8 | 8 | 1 | 0 | 0 | 0 |
| 9 | 9 | 1 | 0 | 1 | 0 |

In passing between states 0 and 1 in table 3, Bits 2 and 3 change and, therefore, possible erroneous codes that can be read during this transition are 0011 and 0000. Similarly, in passing between states 5 and 6 in table 3, Bits 2 and 3 change and, therefore, possible erroneous codes that can be read during this transition are 1111 and 1100. However, these erroneous codes are not used in the main coding (ie they do not correspond to any other state) and are not the same as each other, thereby making it possible to unambiguously decode the position. Thus, all possible codes can be read and correctly interpreted in accordance with Table 4 below.

TABLE 4

| Rounded Interpretation | State | Bit 0 | Bit 1 | Bit 2 | Bit 3 |
|---|---|---|---|---|---|
| 0 | 0 | 0 | 0 | 1 | 0 |
| 0-1 | Transitional 0-1 | 0 | 0 | 0 | 0 |
| Or 0-1 | Transitional 0-1 | 0 | 0 | 1 | 1 |
| 1 | 1 | 0 | 0 | 0 | 1 |

TABLE 4-continued

| Rounded Interpretation | State | Bit 0 | Bit 1 | Bit 2 | Bit 3 |
|---|---|---|---|---|---|
| 2 | 2 | 0 | 1 | 0 | 1 |
| 3 | 3 | 0 | 1 | 1 | 1 |
| 4 | 4 | 0 | 1 | 1 | 0 |
| 5 | 5 | 1 | 1 | 1 | 0 |
| 5-6 | Transitional 5-6 | 1 | 1 | 1 | 1 |
| Or 5-6 | Transitional 5-6 | 1 | 1 | 0 | 0 |
| 6 | 6 | 1 | 1 | 0 | 1 |
| 7 | 7 | 1 | 0 | 0 | 1 |
| 8 | 8 | 1 | 0 | 0 | 0 |
| 9 | 9 | 1 | 0 | 1 | 0 |

Thus, with the design illustrated above, many of the advantages that are achieved with windings arranged on the sensor board in accordance with an exact Gray code can also be achieved when the Gray code is modified slightly in the manner outlined above. Mathematically, this is because the windings are still based on a Gray code, but with the physical separation between the two states that are removed and their immediate neighbours being reduced in the limit to zero.

As mentioned above, the zones of the sensor board 3 corresponding to each state of the Gray code are equally spaced around the dial 5. As those skilled in the art will appreciate, the windings may also be arranged on the sensor board so that these zones are not the same size and do not extend over the same angle of the sensor board 3. This can be used, to provide a sensor in which more zones are provided at certain positions such as near the dial positions '0' and '9'. As those skilled in the art will appreciate, this can assist in interpreting the reading of the odometer when in the rollover state.

The above embodiments have described a position sensor for an odometer. As those skilled in the art will appreciate, the invention can be used in other applications, such as in applications where there is just a single rotating member or even in linear position sensing applications.

In the above embodiment, the windings 21 were mounted on the sensor boards 3. In an alternative embodiment, these windings may be mounted separately from the sensor boards. For example, a helical coil may be mounted along the axis of the corresponding dial 5. As those skilled in the art will appreciate, such a coil (or coils) can still be made balanced with respect to the windings 23 carried by the corresponding sensor board 3.

The invention claimed is:

1. An inductive position encoder comprising:
first and second members which are relatively moveable over a measurement path;
a magnetic device mounted on the first member;
a plurality, n, of first windings mounted on the second member; and
a second winding;
wherein said magnetic device is operable to interact with said windings such that upon the energisation of one of: i) said second winding and ii) said first windings, there is generated a plurality of sensor signals in the other one of said second winding and said first windings, each sensor signal being associated with a respective one of said first windings and varying with the relative position between said magnetic device and the associated first winding and hence with the relative position between said first and second members;
wherein each first winding comprises a plurality of loops sequentially arranged along the measurement path and the loops of each first winding being connected in series so that each first winding is substantially balanced with respect to the background interference;

wherein at least one of said first windings comprises a series of loops arranged along the measurement path;

wherein said plurality of first windings are arranged to define less than $2^n$ zones sequentially arranged along the measurement path in accordance with a predetermined non-repeating code so that said plurality of sensor signals vary with the relative position of said first and second members in accordance with said predetermined non-repeating code; and wherein said plurality of first windings are arranged along said measurement path so that over at least the majority of said zones, said sensor signals vary in accordance with a predetermined Gray code.

2. A position encoder according to claim 1, wherein each of said first windings comprises a plurality of series connected conductor loops, the winding direction of the loops being varied over the measurement path to define different states of said Gray code.

3. A position encoder according to claim 2, wherein a binary one of said Gray code is defined by a conductor loop wound in a first direction and a binary zero of said Gray code is defined by a conductor loop wound in an opposite direction.

4. A position encoder according to claim 1, comprising processing circuitry for processing said sensor signals to determine a code word corresponding to one of said zones and to determine the relative position between said first and second members from the determined code word and an algorithm or stored data relating code words to the positions of said zones.

5. A position encoder according to claim 4, wherein each sensor signal is associated with a corresponding symbol of the code word and wherein said processing circuitry is operable to process each sensor signal to determine a polarity of the sensor signal and to determine the value of the corresponding symbol of said code word based on the determined polarity.

6. A position encoder according to claim 4, wherein each sensor signal is associated with a corresponding symbol of the code word and wherein said processing circuitry is operable to process each sensor signal to determine a time of arrival of the sensor signal and to determine the value of the corresponding symbol of said code word based on the determined time of arrival.

7. A position encoder according to claim 1, wherein said first windings are arranged so that over at least the majority of said zones, said sensor signals vary in accordance with a binary Gray code.

8. A position encoder according to claim 1, wherein said second winding is mounted on said second member.

9. A position encoder according to claim 1, wherein said first windings are receive windings and wherein each of said sensor signals is generated in a respective one of said receive windings.

10. A position encoder according to claim 9, wherein said second member carries said second winding, which is operable to generate a magnetic field for interacting with said magnetic device.

11. A position encoder according to claim 9, wherein said second winding and said plurality of receive windings are arranged so that, in use, there is substantially no electromagnetic coupling between them when the magnetic device is absent.

12. A position encoder according to claim 1, wherein said first windings are excitation windings, wherein said magnetic device is not self-powered and is energised by excitation magnetic fields generated by said excitation windings and wherein said sensor signals are generated in said second winding.

13. A position encoder according to claim 12, wherein said sensor signals are generated in said second winding in a time division multiplexed manner.

14. A position encoder according to claim 12, wherein said first windings and said second winding are arranged so that, in use, there is substantially no electromagnetic coupling between them when the magnetic device is absent.

15. A position encoder according to claim 12, comprising an excitation circuit operable to energise said excitation windings.

16. A position encoder according to claim 15, wherein said excitation circuit is operable to energise said first windings individually and comprising processing circuitry operable to process the sensor signals generated in said second winding in response to the excitation of each of said first windings.

17. A position encoder according to claim 1, wherein said windings are formed from conductor tracks on a printed circuit board.

18. A position encoder according to claim 17, wherein said first windings are superimposed over each other on the same printed circuit board, with conductor tracks forming the first windings being provided on a plurality of different layers of said circuit board to avoid electrical connection between the different windings.

19. A position encoder according to claim 1, wherein said magnetic device comprises one of: a short circuit coil, a conductive element, a resonator, a conductor having a hole, an inhomogeneity in a magnetic film.

20. A position encoder according to claim 1, wherein said second member is fixed and said first member is moveable relative to said second member.

21. A position encoder according to claim 1, wherein each first winding comprises a plurality of loops sequentially arranged along the measurement path and arranged so that a characteristic of the magnetic coupling between that first winding and said second winding changes at the boundary between adjacent loops;

wherein the boundaries between said zones are defined by the locations of the boundaries between the adjacent loops of the different first windings;

wherein each of said first windings is arranged along the measurement path so that relative movement between said magnetic device and the loops of that first winding causes the associated sensor signal to vary in accordance with a respective different symbol of said predetermined code; and wherein said plurality of first windings are arranged along said measurement path so that at least the majority of the boundaries between adjacent loops of said first windings are each located at the boundary between a respective different two zones.

22. A position encoder according to claim 21, wherein said plurality of first windings are arranged along said measurement path so that the boundaries between adjacent loops of each first winding are each located at the boundary between a respective different two zones.

23. A position encoder according to any claim 1, wherein said first windings have different numbers of loops arranged along the measurement path.

24. A position encoder according to claim 1, wherein said first windings are arranged so that the sequential order of the boundaries between adjacent loops of the first windings is based on said predetermined Gray code.

25. A device comprising a plurality of dials and a plurality of position encoders according to claim 1, each associated with a respective one of said dials and each being operable to encode the position of the associated dial.

26. A device according to claim 25, wherein the windings of said position encoders are connected to a common processing circuit.

27. A device according to claim 25, wherein a common receive or a common excitation winding is provided for said plurality of position encoders.

28. An odometer comprising:
a plurality of rotatable dials sequentially positioned adjacent each other and arranged so that as each dial rotates through one revolution, a subsequent dial in the sequence rotates through a part of a revolution;
a corresponding plurality of non-contact position sensing transducers, each non-contact position sensing transducer being located adjacent the corresponding dial between that dial and an adjacent dial in the sequence, and each comprising one or more excitation windings and one or more receive windings;
wherein each dial carries a magnetic device positioned adjacent the corresponding position sensing transducer and operable to interact with said windings such that upon the energisation of said one or more excitation windings there is generated in the one or more receive windings sensor signals that vary with the angular position of the corresponding dial; and
wherein the windings mounted on each position sensing transducer have a position sensing range and wherein said dials and said position sensing transducers are arranged so that the magnetic device carried by each dial is within the position sensing range of the windings of the corresponding position sensing transducer, but outside the position sensing range of the windings of the other position sensing transducers
wherein each dial has a diameter of between 15 mm and 25 mm and is separated from adjacent dials by a distance of between 4 mm and 7 mm.

29. An odometer according to claim 28, wherein at least one of the windings mounted on each position sensing transducer is connected in common with at least one winding on the other position sensing transducers.

30. An odometer according to claim 29, wherein flexible connectors are provided to connect said at least one winding on each position sensing transducer together.

31. An odometer according to claim 30, wherein the windings on each position sensing transducer are connected to a common excitation and processing circuit via said flexible connectors.

32. Use of a position encoder according to claim 1 for the electronic reading of a dial of an odometer.

33. A position encoder according to claim 1, wherein the measurement path is circular.

34. A position encoder according to claim 1, comprising four or more first windings.

35. A position encoder according to claim 1, wherein the loops of said at least one of said first windings are connected in series and arranged so that EMFs induced in adjacent loops by a common background interfering signal oppose each other.

36. A position encoder according to claim 1, wherein the measurement path is circular and wherein the loops of said at least one of said first windings comprises an even number of loops greater than 2, which are arranged along the measurement path.

* * * * *